(12) United States Patent
Kim

(10) Patent No.: US 9,482,192 B2
(45) Date of Patent: Nov. 1, 2016

(54) STABLE COMBUSTION IN SPARK-IGNITED LEAN-BURN ENGINE

(71) Applicant: Caterpillar Inc., Peoria, IL (US)

(72) Inventor: Charlie Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 14/588,559

(22) Filed: Jan. 2, 2015

(65) Prior Publication Data
US 2016/0195041 A1    Jul. 7, 2016

(51) Int. Cl.
| | | |
|---|---|---|
| *F02M 25/14* | (2006.01) | |
| *F02B 19/12* | (2006.01) | |
| *F02B 43/10* | (2006.01) | |
| *F02M 35/104* | (2006.01) | |
| *F02B 19/00* | (2006.01) | |

(52) U.S. Cl.
CPC .............. *F02M 25/14* (2013.01); *F02B 19/12* (2013.01); *F02B 43/10* (2013.01); *F02M 35/104* (2013.01); *F02B 2019/002* (2013.01); *F02B 2043/103* (2013.01)

(58) Field of Classification Search
CPC .............. F02B 19/00; F02B 2019/002; F02B 2019/06; F02B 19/02; F02B 19/06; F02B 19/08; F02B 19/10; F02B 19/12; F02B 19/14; F02B 19/16; F02B 43/10; F02B 2043/103; F02M 25/14; F02M 35/104
USPC .................. 123/253, 254, 255, 256
See application file for complete search history.

(56) References Cited

U.S. PATENT DOCUMENTS

| | | | | |
|---|---|---|---|---|
| 3,958,538 A | * | 5/1976 | Hoshino | F02B 43/10 123/1 A |
| 4,004,554 A | * | 1/1977 | Kosaka | F02B 43/10 123/25 R |
| 5,611,307 A | * | 3/1997 | Watson | F02B 19/1014 123/254 |
| 7,261,097 B2 | | 8/2007 | Gong et al. | |
| 7,832,372 B2 | | 11/2010 | Blank | |
| 8,365,689 B2 | | 2/2013 | Gruber et al. | |
| 8,443,716 B2 | | 5/2013 | Keller | |
| 8,567,369 B2 | | 10/2013 | Johnson | |
| 2003/0116121 A1 | * | 6/2003 | Agama | F02B 1/12 123/259 |
| 2013/0263820 A1 | | 10/2013 | Yu et al. | |
| 2014/0144406 A1 | * | 5/2014 | Schock | F02B 19/12 123/260 |
| 2014/0190437 A1 | * | 7/2014 | Chiera | F02B 9/10 123/145 A |
| 2014/0209057 A1 | * | 7/2014 | Pouring | F02B 19/12 123/257 |

FOREIGN PATENT DOCUMENTS

| | | |
|---|---|---|
| DE | 102005041483 A1 | 3/2007 |
| JP | 2003254063 A | 9/2003 |

\* cited by examiner

*Primary Examiner* — Sizo Vilakazi
(74) *Attorney, Agent, or Firm* — Miller, Matthias & Hull LLP

(57) ABSTRACT

A lean-burn engine may comprise a combustion chamber, an intake manifold configured to provide a lean fuel/air mixture to the combustion chamber, and a pre-chamber in fluid communication with the combustion chamber. The pre-chamber may include a spark igniter configured to initiate combustion of the lean fuel/air mixture in the combustion chamber, and a heating element contained in the pre-chamber. The heating element may be configured to heat the pre-chamber to a temperature sufficient to allow the production of hydrogen peroxide ($H_2O_2$) from fuel and air in the pre-chamber.

6 Claims, 6 Drawing Sheets

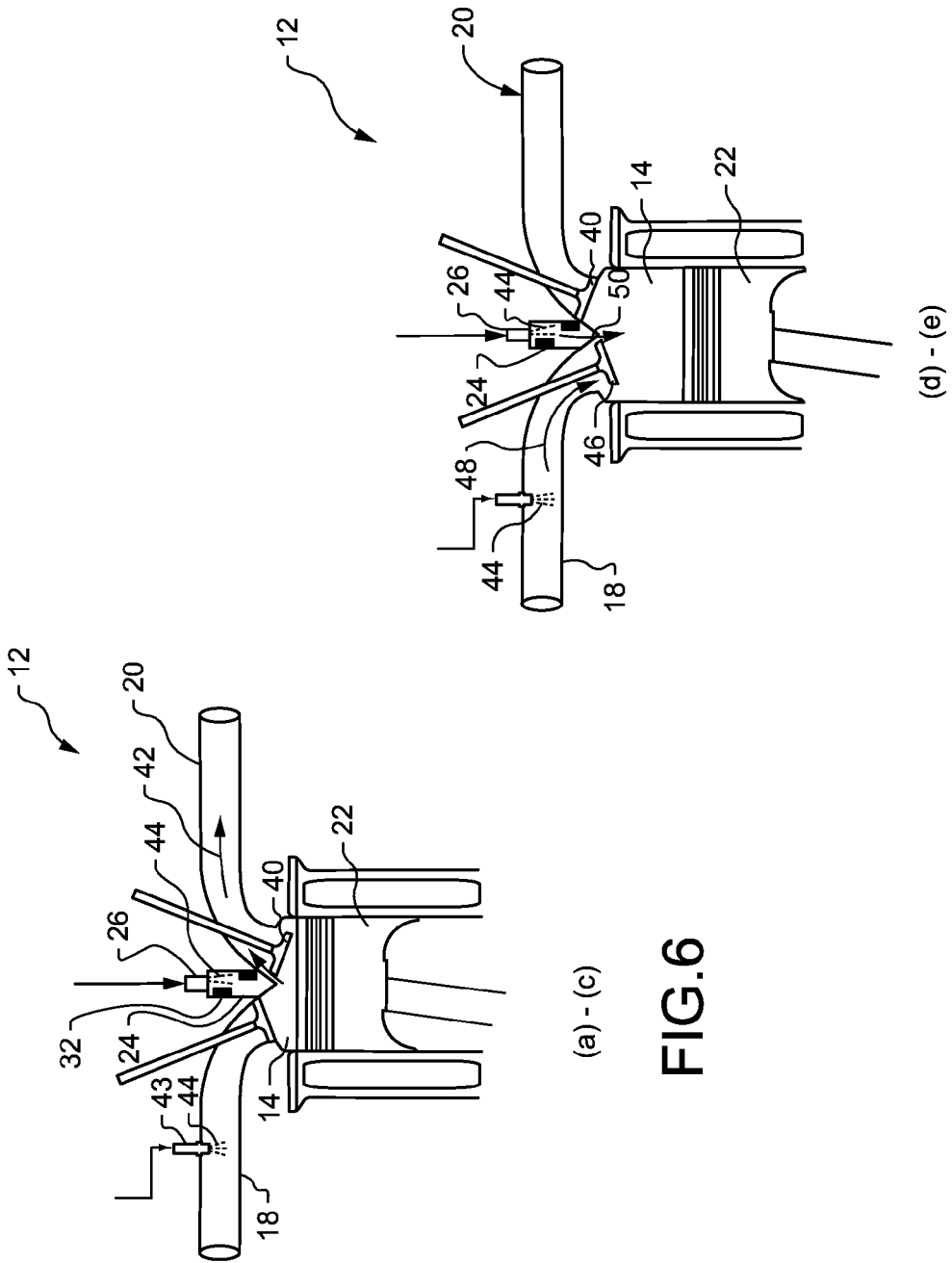

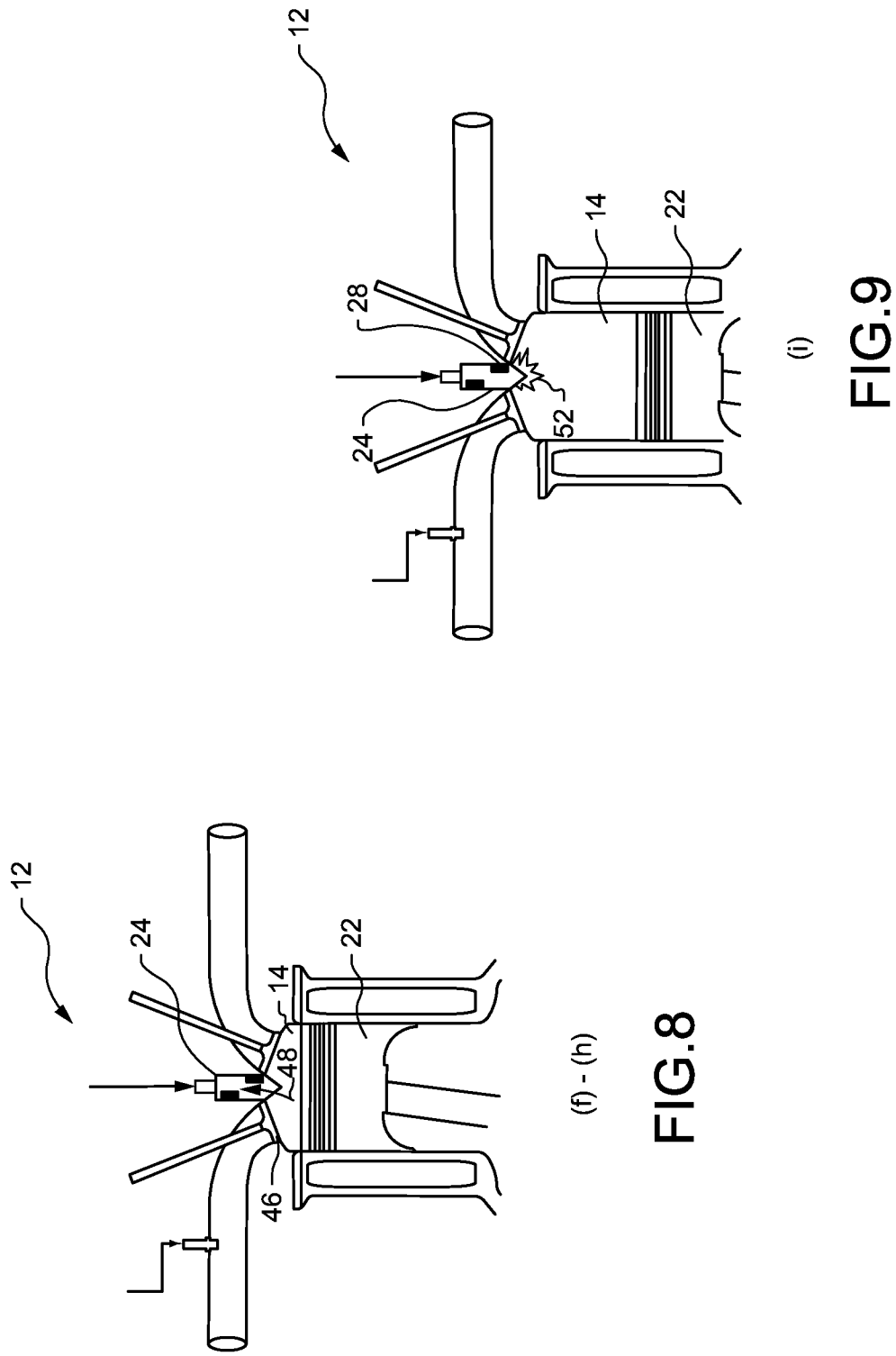

STABLE COMBUSTION IN SPARK-IGNITED LEAN-BURN ENGINE

TECHNICAL FIELD

The present disclosure generally relates to lean-burn engines and, more specifically, relates to systems and methods to achieve stable combustion in spark-ignited lean-burn engines.

BACKGROUND

Natural gas, which consists primarily of methane ($CH_4$), is an attractive energy source as it produces less nitrogen oxides ($NO_x$) and carbon dioxide when burned than other energy sources such as oil or coal. Many natural gas-powered engines, as well as other types of engines, may operate under a "lean-burn" condition in which a lean fuel/air mixture is combusted to generate a mechanical output. A lean fuel/air mixture has an excess of air and a fuel/air ratio of less than one, whereas a rich fuel/air mixture has an excess of fuel and a fuel/air ratio of greater than one. The excess air in a lean fuel/air mixture may lead to reduced emissions of nitrogen oxides ($NO_x$), as well as improvements in fuel efficiency as more oxygen is available to combust with the fuel.

Although effective, engines using lean fuel/air mixtures may be prone to unstable combustion due to pockets of air that are void of sufficient fuel molecules to provide continuous combustion reactions. As a result, lean-burn engines may suffer from unstable combustion which may involve drawbacks such as slow and/or incomplete combustion, or unreliable spark ignition of the lean fuel/air mixtures which could cause misfiring.

As a way to speed up combustion and improve the reliability of ignition, some lean-burn engines may include a pre-chamber to initiate combustion of lean fuel/air mixtures in the main combustion chamber (see U.S. Pat. No. 7,261,097). In particular, the pre-chamber may be a small chamber in fluid communication with the main combustion chamber in which a fuel-rich mixture is ignited by a spark plug. The ignited fuel mixture in the pre-chamber may produce a flame which may jet out into the main combustion chamber to ignite and initiate combustion of the lean fuel/air mixture in the main combustion chamber. Other technologies use free radicals to trigger ignition of lean fuel/air mixtures in combustion chambers, without a spark or flame as the ignition source.

However, there is a need for additional strategies for enhancing combustion stability in lean-burn engines, particularly to support efforts to develop engines designed to operate under leaner and leaner conditions. Among other things, the present disclosure addresses this problem.

SUMMARY

In accordance with one aspect of the present disclosure, a lean-burn engine is disclosed. The lean-burn engine may comprise a combustion chamber, an intake manifold configured to provide a lean fuel/air mixture to the combustion chamber, and a pre-chamber in fluid communication with the combustion chamber. The pre-chamber may include a spark igniter configured to initiate combustion of the lean fuel/air mixture in the combustion chamber, and a heating element contained in the pre-chamber. The heating element may be configured to heat the pre-chamber to a temperature sufficient to allow the production of hydrogen peroxide ($H_2O_2$) from fuel and air in the pre-chamber.

In accordance with another aspect of the present disclosure, a lean-burn engine is disclosed. The lean-burn engine may comprise a combustion chamber, an intake manifold configured to provide a lean fuel/air mixture to the combustion chamber, and a pre-chamber in fluid communication with the combustion chamber. The pre-chamber may include a spark igniter that may be configured to initiate a high temperature combustion of the lean fuel/air mixture in the combustion chamber. The pre-chamber may further include a heating element contained in the pre-chamber, and the heating element may be configured to initiate a medium temperature combustion of fuel and air in the pre-chamber. The medium temperature combustion may generate hydrogen peroxide ($H_2O_2$) in the pre-chamber, and the $H_2O_2$ may be configured to disassociate into hydroxyl radical (OH·) that stabilize combustion in both the pre-chamber and the combustion chamber.

In accordance with another aspect of the present disclosure, a method for stabilizing combustion in a lean-burn engine is disclosed. The method may comprise providing the lean-burn engine, wherein the lean-burn engine includes a combustion chamber and a pre-chamber in fluid communication with the combustion chamber, and wherein the pre-chamber has a spark igniter and a heating element contained in the pre-chamber. The method may further comprise providing a mixture of fuel and air to the pre-chamber, and using the heating element to heat the pre-chamber to a temperature sufficient to produce hydrogen peroxide ($H_2O_2$) from the fuel and the air in the pre-chamber. The method may further comprise providing a lean fuel/air mixture to the combustion chamber, and delivering the $H_2O_2$ produced in the pre-chamber to the combustion chamber. The method may further comprise igniting the lean fuel/air mixture in the combustion chamber with the spark igniter to initiate combustion of the lean fuel/air mixture, wherein the ignition produces hydroxyl radicals (OH·) from the $H_2O_2$. In addition, the method may further comprise stabilizing the combustion in the combustion chamber with the OH· radicals.

These and other aspects and features of the present disclosure will be more readily understood when read in conjunction with the accompanying drawings.

BRIEF DESCRIPTION OF THE DRAWINGS

FIG. 6 is a schematic representation of a portion of a gas-exchange process of the combustion cycle of FIG. 5, constructed in accordance with the present disclosure.

FIG. 7 is a schematic representation of a subsequent portion of the gas-exchange process, constructed in accordance with the present disclosure.

FIG. 8 is a schematic representation of a compression stage of the combustion cycle, constructed in accordance with the present disclosure.

FIG. 9 is a schematic representation of a combustion stage of the combustion cycle, constructed in accordance with the present disclosure.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with a particular type of engine. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 2:
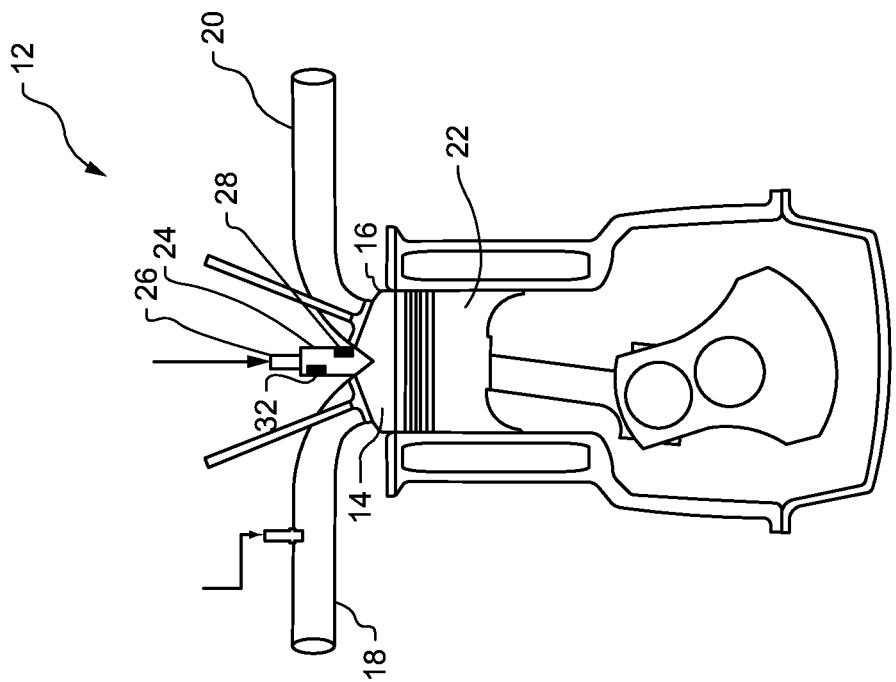
FIG. 2 is a schematic representation of the lean-burn engine shown in isolation, constructed in accordance with the present disclosure.
Figure 1:
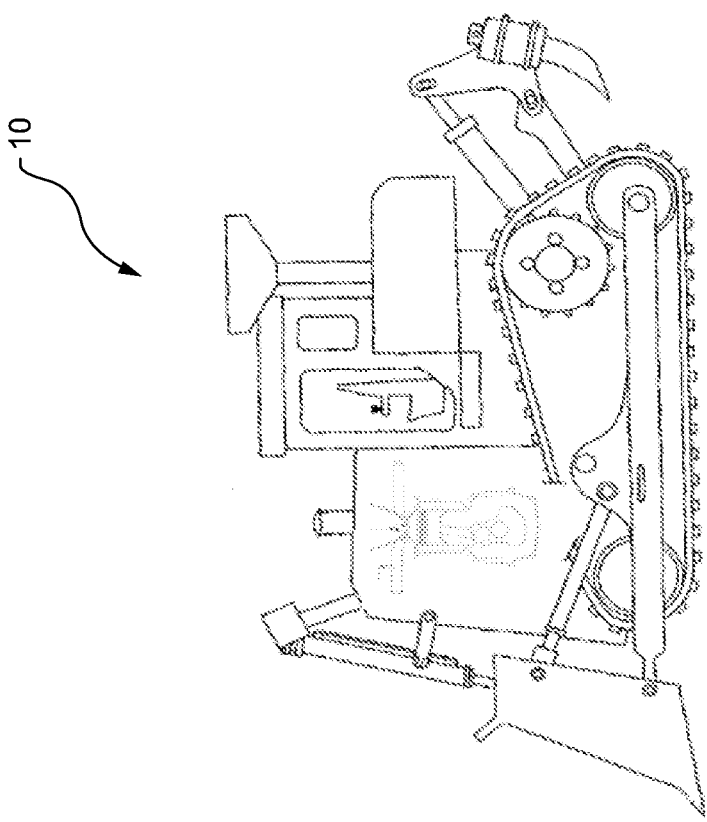
FIG. 1 is a schematic representation of a work machine having a lean-burn engine, constructed in accordance with the present disclosure.

Referring now to the drawings, and with specific reference to FIGS. 1-2, a work machine 10 having a lean-burn engine 12 is shown. The work machine 10 may perform an operation associated with mining, construction, farming, transportation, or other industries known in the art. As non-limiting examples, the work machine 10 may be a dozer, a loader, an excavator, or a dump truck. Alternatively, it may be a power generator, a pump, a passenger vehicle, a marine vessel, or any other type of machine powered by a lean-burn engine. As used herein, a "lean-burn" engine is an engine that at least temporarily operates under lean conditions in which the fuel/air ratio is less than one. The lean-burn engine 12 may use natural gas (i.e., methane ($CH_4$)) as fuel, although other types of fuel (e.g., diesel, gasoline, etc.) may also be used in some cases. In addition, the lean-burn engine 12 may be a turbocharged, naturally-aspirated, supercharged, or intercooled engine.

In general, the lean-burn engine 12 may include a main combustion chamber 14 disposed in a cylinder head 16, an intake manifold 18 configured to provide a lean fuel/air mixture to the combustion chamber 14, an exhaust manifold 20, and a piston 22 disposed within the combustion chamber 14, as best shown in FIG. 2. The lean-burn engine 12 may further include a pre-chamber 24 in fluid communication with the combustion chamber 14. The pre-chamber 24 may have a small volume compared to the combustion chamber 14, and it may be positioned on top of the cylinder head 16, as shown. In particular, the pre-chamber 24 may have a volume of about 1-2% of the total volume of the combustion chamber 14. Alternative engine arrangements may further include an exhaust gas re-circulation system to re-circulate exhaust gas by-products to the intake manifold 18 and/or the pre-chamber 24. In operation, the lean-burn engine 12 may compress the lean fuel/air mixture in the combustion chamber 14, and may controllably spark-ignite the lean fuel/air mixture to initiate combustion of the lean fuel/mixture, thereby producing power output to drive the piston 22 in Otto cycle fashion (see further details below).

Figure 3:
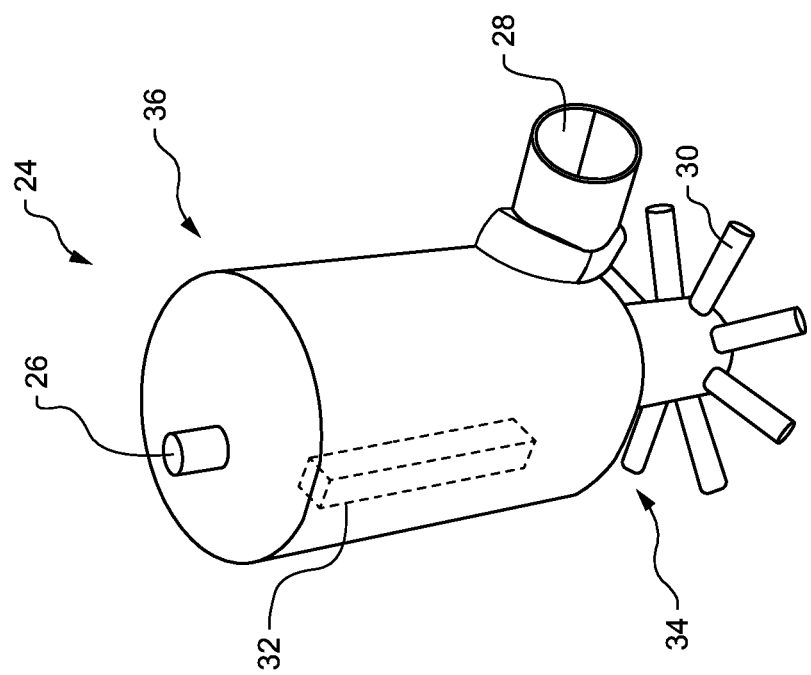
FIG. 3 is perspective view of a pre-chamber and a heating element of the lean-burn engine, constructed in accordance with the present disclosure.
Figure 5:
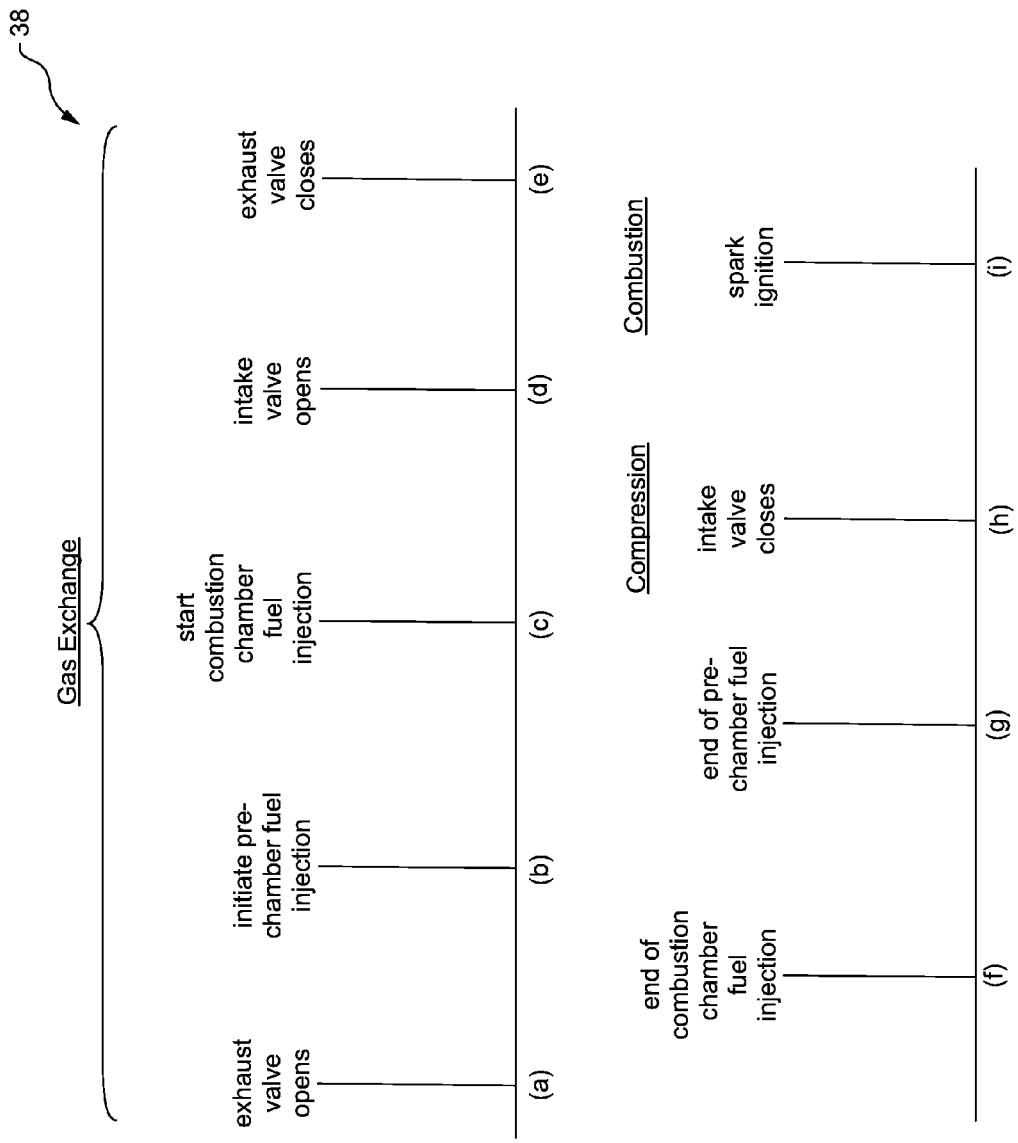
FIG. 5 is a timeline of a series of events involved in a combustion cycle of the lean-burn engine, in accordance with the present disclosure.

Turning now to FIG. 3, a more detailed view of the pre-chamber 24 is shown. The pre-chamber 24 may include a fuel injector 26 (or other fuel delivery device) configured to inject natural gas fuel into the pre-chamber 24. The pre-chamber 24 may further include a spark igniter 28, a plurality of cylindrical holes 30 in fluid communication with the combustion chamber 14, and a heating element 32. In one arrangement, the pre-chamber 24 may have seven to eight of the cylindrical holes 30 extending radially from a bottom portion 34 of the pre-chamber 24, although other numbers and arrangements of the holes 30 are possible. In addition, as shown in FIG. 3, the fuel injector 26 and the heating element 32 may be disposed near a top portion 36 of the pre-chamber 24, while the spark igniter 28 and the cylindrical holes 30 may be disposed near the bottom portion 34 of the pre-chamber 24. However, it will be understood that the fuel injector 26, the heating element 32, the spark igniter 28, and the holes 30 may have alternative positions in the pre-chamber 24 than those shown in FIG. 3.

Notably, the heating element 32 may heat the pre-chamber 24 to a temperature sufficient to induce medium temperature combustion of fuel and air in the pre-chamber 24. As used herein, "medium temperature combustion" refers to combustion that occurs in a temperature range of about 800 kelvin (K) to about 1200 K. The medium temperature range combustion in the pre-chamber 24 may advantageously induce the production of hydrogen peroxide ($H_2O_2$), as the production of $H_2O_2$ from $CH_4$ and $O_2$ occurs at temperature range of about 700 K to about 950 K (see FIG. 4). The $H_2O_2$ may then be transferred to the combustion chamber 14 via the cylindrical holes 30, and the $H_2O_2$ may dissociate to provide hydroxyl radicals (OH·) under appropriate conditions (see further details below). The OH· radicals may speed up and stabilize combustion of the lean fuel/air mixture in the combustion chamber 14, according to mechanisms well-understood by those with ordinary skill in the art. Thus, the present disclosure leverages the ability of the heating element 32 to induce the production of $H_2O_2$ as a precursor to combustion-stabilizing OH· radicals in order to promote combustion stability under lean conditions.

The heating element 32 may have a surface temperature sufficient to heat the pre-chamber enough to induce medium temperature combustion in the pre-chamber 24, but it may be below a temperature that is sufficient to induce auto-ignition of the lean fuel/air mixture in the combustion chamber 14, such that full control over combustion initiation in the combustion chamber 14 with the spark igniter 28 is maintained. For example, the heating element 32 may have a surface temperature in a range of about 900K or about 1600 K, although the surface temperature may vary depending on the size and design of the heating element 32. Furthermore, the heating element 32 may be located inside of the pre-chamber 24 and positioned near the fuel injector 28 in order to heat the fuel as it enters the pre-chamber 24. In order to enhance heat transfer from the heating element 32 to the fuel, the heating element 32 may be oriented substantially perpendicular to a flow path of the fuel as it enters the pre-chamber 24 from the fuel injector 26. However, the heating element 32 may also be parallel or otherwise angled with respect to the fuel flow path.

Figure 4:
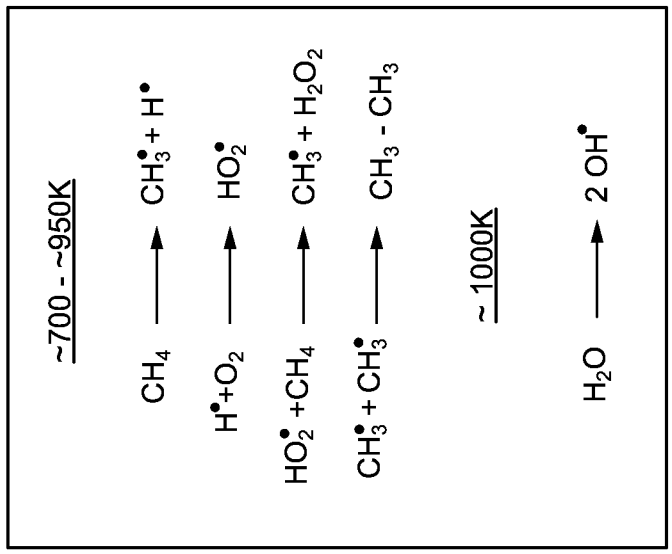
FIG. 4 is a schematic representation of the reactions that may occur in the pre-chamber to produce peroxide ($H_2O_2$) and hydroxyl radicals (OH·), in accordance with the present disclosure.

FIG. 4 shows the reaction mechanism involved in producing $H_2O_2$ from the fuel ($CH_4$) and oxygen ($O_2$) in the pre-chamber 24. When temperatures in the pre-chamber 24 reach the range of at least about 700 K to about 950 K due to the heating action of the heating element 32, the $CH_4$ may disassociate to produce methyl radicals ($CH_3 \cdot$) and hydrogen radicals ($H \cdot$). The hydrogen radicals ($H \cdot$) may react with $O_2$ to produce hydroperoxyl radicals ($HO_2 \cdot$), which may then abstract a hydrogen from another $CH_4$ molecule to produce $H_2O_2$ and $CH_3 \cdot$ radicals. The $CH_3 \cdot$ radicals may then recombine to produce ethane ($CH_3$—$CH_3$). At temperatures above 1000 K, the produced $H_2O_2$ may disassociate to form the $OH \cdot$ radicals, as shown. In some cases, the $OH \cdot$ radicals may be formed in the pre-chamber 24 if local temperatures (e.g., at the surface of the heating element 32) are at least 1000 K. Otherwise, the $OH \cdot$ radicals may be formed in the combustion chamber 14/pre-chamber 24 upon ignition with the spark igniter 28, which may instantaneously heat both chambers to temperatures well above 1200 K. It is noted that spark ignition by the spark igniter 28 alone will not likely produce $H_2O_2$ from fuel ($CH_4$) and $O_2$ because the heat supply is instantaneous and does not provide enough time for the reactions to occur.

Referring now to FIGS. 5-9, a series of events that may be involved in a single combustion cycle 38 of the lean-burn engine 12 are shown. In particular, FIG. 5 lists some of the events that occur during the gas-exchange process, the compression stage, and the combustion stage of the combustion cycle 38, with the spacing between the events not being representative of time intervals. FIGS. 6-9 illustrate some of the events of FIG. 5 as they occur in the lean-burn engine 12.

Beginning with the gas-exchange process, an exhaust valve 40 of the exhaust manifold 20 may open to allow an exhaust gas 42 to evacuate the combustion chamber 14 through the exhaust manifold 20 (event (a)). During this time, the exhaust gas 42 may be pushed out of the combustion chamber 14 and into the exhaust manifold 20 by the upward movement of the piston 22 (see FIG. 6). In addition, pre-chamber fuel injection through the fuel injector 26 and combustion chamber fuel injection through a fuel injector 43 on the intake manifold 18 may be initiated to start the flow of fuel 44 into the pre-chamber 24 and the intake manifold 18, respectively (events (b)-(c) and FIG. 6). Thus, the fuel 44 in the intake manifold 18 may be mixed with air to produce a lean fuel/air mixture for delivery to the combustion chamber 14. In addition, the fuel 44 in the pre-chamber 24 may mix with air and may be heated by the heating element 32 to induce medium temperature combustion and the production of $H_2O_2$. In some cases, the $H_2O_2$ produced in the pre-chamber 24 may disassociate and produce $OH \cdot$ radicals if local temperatures are at least 1000 K, such as near the surface of the heating element 32. If produced, such $OH \cdot$ radicals may accelerate and stabilize combustion in the pre-chamber 24 as well.

Once the exhaust gas 42 is sufficiently evacuated from the combustion chamber 14, an intake valve 46 may open to allow a fresh lean fuel/air mixture 48 to enter the combustion chamber 14 from the intake manifold 18 and replace the evacuated exhaust gases, and the exhaust valve 40 may close (events (d)-(e) and FIG. 7). In addition, a vacuum created in the combustion chamber 14 by the downward movement of the piston 22 may draw the fresh lean fuel/air mixture 48 into the combustion chamber 14. The downward movement of the piston 22 may also draw $H_2O_2/OH \cdot$ radicals 50 (as well as other gases) through the holes 30 of the pre-chamber 24 and into the combustion chamber 14 (see FIG. 7). In this way, the $H_2O_2/OH \cdot$ radicals 50 may be pre-positioned in the combustion chamber 14 during the gas-exchange process prior to initiation of combustion in the combustion chamber 14 by the spark igniter 28.

After completion of the gas-exchange process (i.e., events (a)-(e)), the fuel injections in the intake manifold 18 and the pre-chamber 24 may cease (events (f)-(g)), and the compression stage may begin. Specifically, the intake valve 46 may close (event (h)) and the lean fuel/air mixture 48 in the combustion chamber 14 may be compressed pressurized by the upward movement of the piston 22 (see FIG. 8). Furthermore, the upward movement of the piston 22 may push some of the lean fuel/air mixture 48 into the pre-chamber 24 via the holes 30 to provide a source both fuel and $O_2$ for the production of $H_2O_2$ in the pre-chamber 24 (see FIG. 8).

High temperature combustion of the lean fuel/air mixture in the combustion chamber 14 may then be initiated by ignition of the spark igniter 28 (event (i) and FIG. 9). As used herein, "high temperature combustion" refers to combustion that occurs at temperatures higher than 1200 K. In particular, ignition of the spark igniter 28 may produce a high temperature flame 52 (i.e., >1200 K) that jets out of the holes 30 and ignites the lean fuel/air mixture 48 in the combustion chamber 14. The $H_2O_2$ in the combustion chamber 14 may then disassociate to produce $OH \cdot$ radicals which may speed up and stabilize the combustion in the combustion chamber 14. The combustion may release enough energy to drive the downward movement of the piston 22 (see FIG. 9), and the combustion cycle 38 may then repeat. As will be appreciated, the combustion cycle 38 (gas-exchange, compression, and combustion) proceeds with two strokes of the piston 22.

Figure 10:
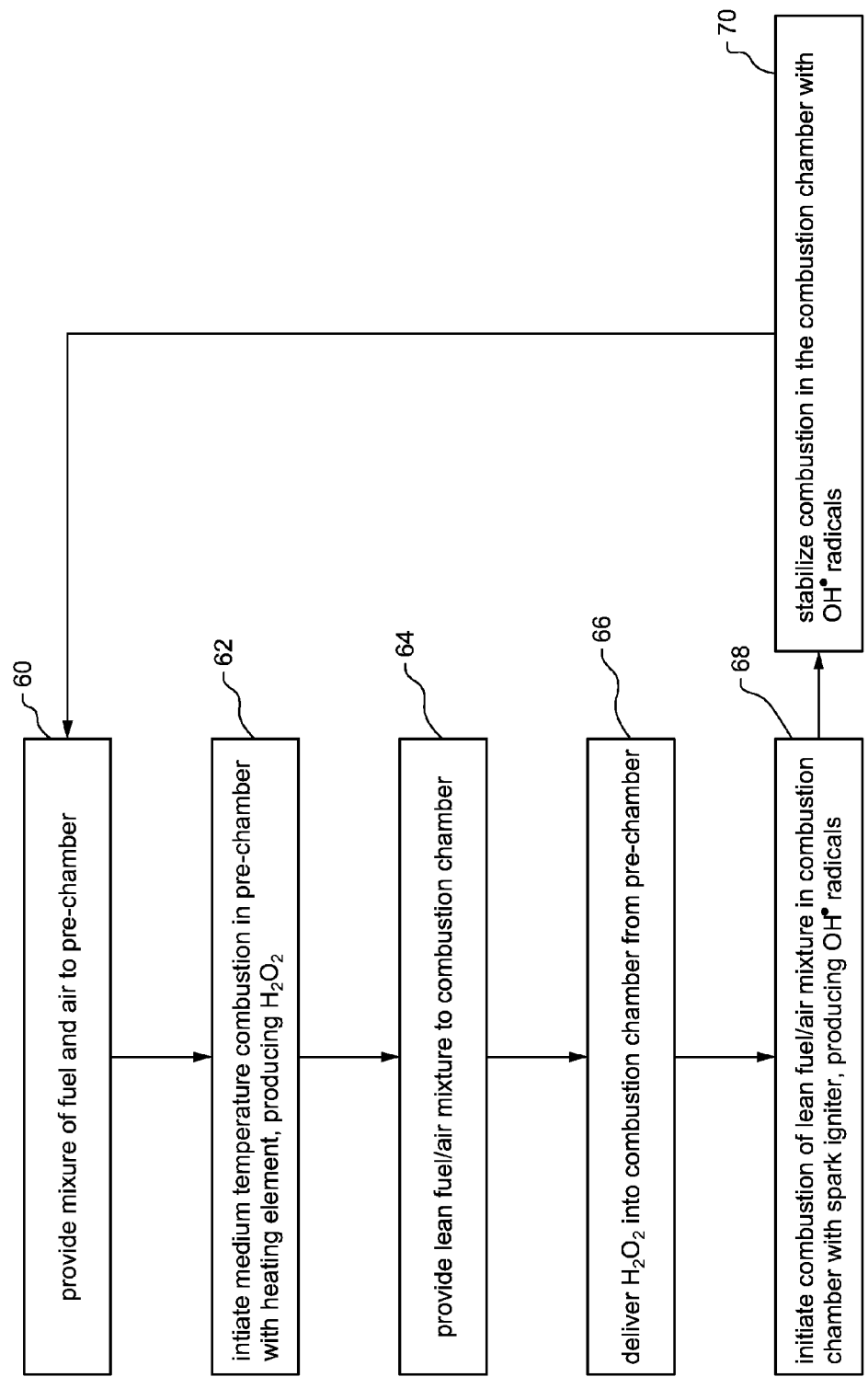
FIG. 10 is a flowchart depicting a series of steps that may be involved in stabilizing combustion in the lean-burn engine, in accordance with a method of the present disclosure.

Turning now to FIG. 10, a series of steps that may be involved in stabilizing combustion in the lean-burn engine 12 in accordance with the present disclosure are shown. It is noted that the steps depicted in FIG. 10 are part of the combustion cycle 38 described above and are thus cyclic and repetitive, as shown. Beginning with a block 60, a mixture of fuel and air may be provided to the pre-chamber 24. As explained above, the fuel and air mixture in the pre-chamber 24 is a mixture of the fuel 44 from the fuel injector 26 and the lean fuel/air mixture 48 provided by the combustion chamber 14 during the compression stage (see FIG. 8), as well as residual gases from previous combustion cycles. In particular, the supply of the fuel 44 to the pre-chamber 24 from the fuel injector 26 should be controlled to provide at least a stoichiometric (1:1) or leaner ratio between fuel and air in the pre-chamber 24 in order to ensure that there is sufficient $O_2$ for $H_2O_2$ production.

According to a next block 62, medium temperature combustion of the fuel and air in the pre-chamber 24 may be initiated by the heating element 32, thereby producing $H_2O_2$ as well as $OH \cdot$ radicals if local temperatures are high enough. A lean fuel/air mixture may then be provided to the combustion chamber 14 from the intake manifold 18 (block 64), and $H_2O_2$ (as well as any $OH \cdot$ radicals) may be delivered to the combustion chamber 14 from the pre-chamber 24 (block 66). As explained above, the lean fuel/air mixture 48 and the $H_2O_2/OH \cdot$ radicals 50 may be supplied to the combustion chamber 14 during the gas-exchange process of the combustion cycle 38 (see FIG. 7). Combustion may then be initiated in the combustion chamber 14 with the spark igniter 28, thereby producing $OH \cdot$ radicals from the $H_2O_2$ in the combustion chamber 14 (block 68). The $OH \cdot$ radicals may then speed up and stabilize the combustion of the lean fuel/air mixture in the combustion chamber 14 (block 72), and the series of steps may repeat in subsequent combustion cycles, as shown.

Although the combustion-stabilization approach of the present disclosure is taught in the context of a natural gas lean-burn engine, it will be understood that the concepts disclosed herein may be applied to any type of engine having a pre-chamber.

INDUSTRIAL APPLICABILITY

The teachings of the present disclosure may find industrial applicability in a variety of settings such as, but not limited to, applications using natural gas lean-burn engines. The lean-burn engine disclosed herein uses a heating element positioned in a pre-chamber to induce medium temperature combustion and the production of $H_2O_2$ in the pre-chamber. The $H_2O_2$ may be supplied to the main combustion chamber prior to spark ignition to provide a source of combustion-stabilizing OH· radicals. Thus, the concepts disclosed herein may be used to increase the combustion stability in lean-burn engines (in both the pre-chamber and the main combustion chamber), as well as to extend lean-burn regimes to leaner and leaner conditions to further reduce $NO_x$ emissions. Moreover, the heating element disclosed herein is separate from the spark igniter, such that full-control over the spark ignition in the main combustion chamber is maintained. It is expected that the technology disclosed herein may find wide industrial applicability in a wide range of areas such as, but not limited to, power generation, transportation, mining, and farming applications.

What is claimed is:

1. A method for stabilizing combustion in a lean-burn engine, comprising:
providing the lean-burn engine, the lean-burn engine including a combustion chamber and a pre-chamber in fluid communication with the combustion chamber, the pre-chamber having a spark igniter and a heating element contained in the pre-chamber;
providing a mixture of fuel and air to the pre-chamber;
using the heating element to heat the pre-chamber to a temperature sufficient to produce hydrogen peroxide ($H_2O_2$) from the fuel and the air in the pre-chamber;
providing a lean fuel/air mixture to the combustion chamber;
delivering the $H_2O_2$ produced in the pre-chamber to the combustion chamber;
igniting the lean fuel/air mixture in the combustion chamber with the spark igniter to initiate combustion of the lean fuel/air mixture, the ignition producing hydroxyl radicals (OH·) from the $H_2O_2$; and
stabilizing the combustion in the combustion chamber with the OH· radicals.

2. A method as set forth in claim 1, wherein delivering the $H_2O_2$ includes the step of delivering the $H_2O_2$ to the combustion chamber prior to initiation of the combustion of the lean fuel/air mixture by the spark igniter.

3. A method as set forth in claim 2, wherein the $H_2O_2$ in the combustion chamber disassociates into hydroxyl radicals (OH·) upon initiation of the combustion of the lean fuel/air mixture by the spark igniter, and wherein the OH· radicals stabilize the combustion of the lean fuel/air mixture in the combustion chamber.

4. A method as set forth in claim 1, wherein using the heating element to heat the pre-chamber includes the step of using the heating element to heat the pre-chamber to a temperature sufficient to initiate medium temperature combustion of the fuel and the air in the pre-chamber.

5. A method as set forth in claim 4, wherein a temperature of the heating element is at least 900 K, and wherein the temperature of the heating element is below a temperature sufficient to cause auto-ignition of the lean fuel/air mixture in the combustion chamber.

6. A method as set forth in claim 5, wherein a ratio of the fuel to the air in the pre-chamber is one or less.

* * * * *